Aug. 17, 1943.      J. JONAS      2,327,190
PROTECTIVE ARRANGEMENT FOR HIGH VOLTAGE SYSTEMS
Filed March 25, 1941
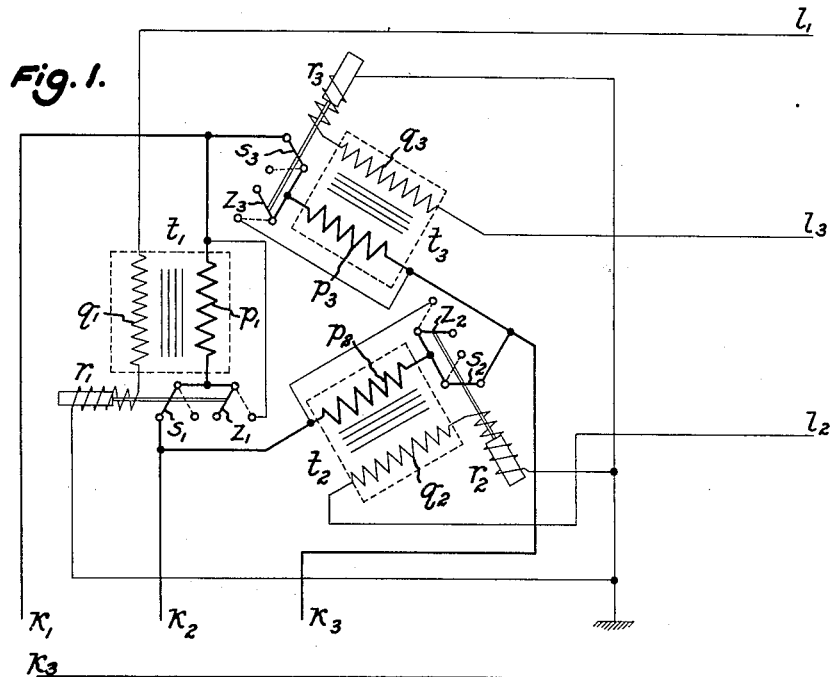
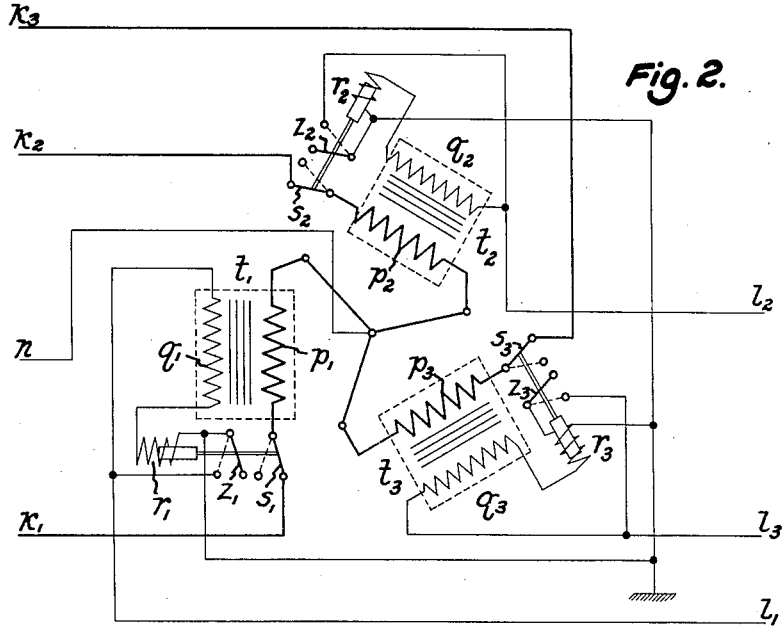
Inventor:
Julius Jonas
By Pierce & Scheffler
Attorneys.

Patented Aug. 17, 1943

2,327,196

UNITED STATES PATENT OFFICE 2,327,196

PROTECTIVE ARRANGEMENT FOR HIGH VOLTAGE SYSTEMS

Julius Jonas, Zurich, Switzerland, assignor to Aktiengesellschaft Brown, Boveri & Cie., Baden, Switzerland Application March 25, 1941, Serial No. 385,190 In Switzerland April 10, 1940

6 Claims. (Cl. 175—294)

The invention relates to high voltage polyphase electric transmission systems and particularly to means for protecting such systems from the effects of earth faults and short circuits.

It is known that polyphase high voltage lines can be protected against the effects of earth faults by earthing the neutral point of a winding connected to the line by means of an inductance which is at least approximately in resonance with the capacity of the network to earth. Such coils extinguish the earth fault arc and enable the line to remain in service with a single phase-to-earth fault. They have, however, the disadvantage that in the event of an earth fault (and with an unsymmetrical network even in normal service) the voltage of the line to earth becomes greatly displaced so that the insulators must be dimensioned for considerably higher voltages and in consequence the test voltage must therefore also be higher. With high voltage lines the voltage displacement of the line relative to the earth results in uneconomical conditions because with such high operating voltages it is difficult to obtain a durable insulation even for the simple phase voltage. Also the arc extinction coil does not provide protection against a double pole earth fault or a short circuit between two line conductors. For this reason high voltage lines are provided with a directly earthed neutral point so that the conductors and apparatus have only to be insulated against the earth for the simple phase voltage. Protection against earth faults and short circuits between phases is provided by means of high-speed switching devices which are located as usual on the high voltage side of the line. Upon the occurrence of an earth fault or short circuit on one or more of the network conductors the switching devices disconnect the affected conductor as soon as possible. In order to avoid a service interruption of long duration the conductor on which the fault occurs is switched out and in at short intervals and the conductor is only then finally disconnected when it is shown that a disconnection of short duration is not sufficient to eliminate the cause of the fault. The disadvantage of this protective device is, however, that the switch apparatus is subjected to a high voltage and must therefore be very well insulated, thus increasing the cost of the installation and complicating the operation of the system.

The object of the present invention is therefore to provide an improved protective arrangement which does not possess the aforementioned disadvantages. This is achieved according to the invention by producing the voltages of the individual phases of the high voltage line in mutually independent magnetic circuits of a transformer arrangement, each winding branch of the low voltage side of the transformer arrangement being provided with a quick-acting switching device which operates upon the occurrence of an earth fault or short circuit in the high voltage conductor associated with this particular phase and disconnects the conductor or the associated winding branch on the low voltage side at least temporarily. The circuit breakers for this high speed interruption thus only need to be dimensioned for a low voltage so that standard designs can be employed.

Two constructional examples of the invention are illustrated diagrammatically in Figs. 1 and 2 of the accompanying drawing.

In Figs. 1 and 2 the three-phase high voltage system $l_1$, $l_2$, $l_3$ is supplied from a transformer arrangement the primary windings $p_1$, $p_2$, $p_3$ of which are connected to the low voltage supply network $k_1$, $k_2$, $k_3$. This supply network can also be replaced by the bus bars of a generator. The secondary windings $q_1$, $q_2$, $q_3$ of the transformer arrangement are star connected the star point being directly earthed. There are no circuit breakers located on the high voltage side which have to be operated under voltage. The circuit breakers $z_1$, $z_2$, $z_3$ on the high voltage side shown in Fig. 2 and connected in parallel with the secondary windings $q_1$, $q_2$, $q_3$ must only have a sufficient insulation clearance but do not need to interrupt any power. Their function is referred to later on; they can often be dispensed with or located on the low voltage side as shown in Fig. 1. With the arrangements shown in Figs. 1 and 2 the service circuit breakers $s_1$, $s_2$, $s_3$ are located in series with the primary winding branches $p_1$, $p_2$, $p_3$ respectively and in such a manner that when there is a disconnected winding either in the delta system of connections shown in Fig. 1 or the star system of connections shown in Fig. 2 a two-phase three-wire operation, with star connection by means of the neutral wire $n$, is always possible. The magnetic coupling between the primary side carrying the low voltage and the secondary side of the transformer arrangement connected to the transmission line is constructed in such a manner that a magnetic coupling between individual phases does not exist. A three-phase transformer with at least one additional core arranged to suit can thus be used. It is, however, preferable to employ three separate single-phase transformers.

In order to explain the manner in which this protective system operates it is assumed that for instance the conductor $l_1$ of the transmission line has an earth fault. The circuit breakers $s_1$, $s_2$, $s_3$ are normally closed. The circuit breakers $z_1$, $z_2$, $z_3$ are always open during normal operation. By means of the supervisory relays $r_1$, $r_2$, $r_3$, shown in the high voltage side of each of the phases, the circuit breakers $s_1$, $s_2$, $s_3$ can be opened. In this case, circuit breaker $s_1$ is opened by the action of relay $r_1$, while breakers $s_2$ and $s_3$ remain closed. The primary winding $p_1$ is disconnected and the conductor $l_1$ is made dead. If there is only an earth fault arc this will be extinguished when the circuit breaker $s_1$ opens and the conductor $l_1$ can be put under voltage again by closing the circuit breaker $s_1$. If the conductor $l_1$ has, however, a permanent earth fault the transmission of energy will not be interrupted by the opening of the circuit breaker $s_1$ because both of the conductors $l_2$, $l_3$ which are not affected by the fault take over by way of the earth conductor the whole of the power to be transmitted and in such a manner that a two-phase three-wire service results, the earth being used as the return conductor. Upon opening the circuit breaker $s_1$, the circuit breaker $z_1$ is closed, whereby the primary winding $p_1$ is shunted and thereby the building up of an excessive voltage in the faulty conductor $l_1$ is prevented so that the latter can be utilized for the transmission of power. The defective part of the line can thus be repaired without any interruption in service.

The conditions are similar if instead of a single-phase earth fault a two-phase earth fault occurs. If for instance both conductors $l_1$ and $l_2$ have an earth fault simultaneously both earth fault arcs are extinguished by opening the circuit breakers $s_1$ and $s_2$ on the primary side. When there is a two-phase permanent earth fault on the line the closing of circuit breakers $z_1$, $z_2$ makes it possible to maintain a single-phase service with reduced power. The effects of a normal line-to-line fault can also be similarly eliminated. Two-phase earth faults or short circuits are, however, comparatively rare. Single-phase earth faults are a far more common occurrence and as already described these do not result in an interruption or restriction of the power transmission.

A special advantage of the protective arrangement described is that the circuit breakers which have to be operated in service are located on the low voltage side so that it is possible to extinguish an earth fault or short-circuit arc by repeated opening and closing of the circuit breakers $s$ as long as there is not a permanent earth fault or short circuit. With protective arrangements of this kind it is of course essential to ensure that on both sides of the transmission line the individual phases are not magnetically interlinked.

I claim:

1. In a high voltage polyphase electric transmission system including a conductor for each phase, transformer means for supplying the voltages of the individual phases of the high voltage line, said transformer means having mutually independent magnetic circuits for each phase and each low voltage winding of said transformer means including a high speed circuit breaker in the low voltage supply line thereto and means to open said breaker in response to an earth fault or a short circuit on the high voltage conductor corresponding to such winding.

2. In a high voltage polyphase electric transmission system including a conductor for each phase, transformer means for supplying the voltages of the individual phases of the high voltage line, said transformer means having mutually independent magnetic circuits for each phase and the low voltage windings of said transformer means being connected in delta, and a high speed circuit breaker in series with each low voltage winding in the low voltage supply line thereto and means to open said breaker in response to an earth fault or a short circuit on the high voltage conductor corresponding to such winding.

3. In a high voltage polyphase electric transmission system including a conductor for each phase, transformer means for supplying the voltages of the individual phases of the high voltage line, said transformer means having mutually independent magnetic circuits for each phase and the low voltage windings of said transformer means being star-connected with a neutral conductor connected to the star-point, and a high speed circuit breaker in series with each low voltage winding in the low voltage supply line thereto and means to open said breaker in response to an earth fault or a short circuit on the high voltage conductor corresponding to such winding.

4. In a high voltage polyphase electric transmission system including a conductor for each phase, transformer means for supplying the voltages of the individual phases of the high voltage line, said transformer means having mutually independent magnetic circuits for each phase and each low voltage winding of said transformer means including a high speed circuit breaker in the low voltage supply line thereto, means to open said breaker in response to an earth fault or a short circuit on the high voltage conductor corresponding to such winding, switch means adapted to short circuit each of the primary windings of said transformer means, and means to close said switch means upon the occurrence of an earth fault on the high voltage conductor corresponding to such winding.

5. In a high voltage polyphase electric transmission system including a conductor for each phase, a separate single phase transformer for supplying the voltage of each of the individual phases of the high voltage line, each low voltage winding of said transformers including a high speed circuit breaker in the low voltage supply line thereto and means to open said breaker in response to an earth fault or a short circuit on the high voltage conductor corresponding to such winding.

6. In a high voltage polyphase electric transmission system including a conductor for each phase, transformer means for supplying the voltages of the individual phases of the high voltage line, said transformer means having mutually independent magnetic circuits for each phase and each low voltage winding of said transformer means including a high speed circuit breaker adapted to disconnect such winding and switch means adapted to short circuit such winding, and relay means responsive to an earth fault or a short circuit in the high voltage conductor corresponding to such winding to open said circuit breaker and to close said switch means.

JULIUS JONAS.